United States Patent [19]
Cailliot

[11] 3,967,546
[45] July 6, 1976

[54] METHOD AND APPARATUS FOR MAKING COFFEE

[76] Inventor: Serge Cailliot, 38, Rue du Bois de Boulogne, 92200 Neuilly-sur-Seine, France

[22] Filed: June 27, 1974

[21] Appl. No.: 483,516

[30] Foreign Application Priority Data
July 9, 1973 France .............................. 73.25085
May 30, 1974 France .............................. 74.18815

[52] U.S. Cl. .............................. 99/286; 99/289 R; 99/302 C
[51] Int. Cl.² .......................................... A47J 31/00
[58] Field of Search .......... 99/286, 287, 289, 302 C, 99/279

[56] References Cited
UNITED STATES PATENTS

| | | | |
|---|---|---|---|
| 1,789,334 | 1/1931 | Englung | 99/289 |
| 3,017,004 | 1/1962 | Fawick | 192/105 B |
| 3,184,025 | 5/1965 | Aschauer | 192/105 B |
| 3,233,535 | 2/1966 | Fowlie | 99/289 |
| 3,564,991 | 2/1971 | Longinotti | 99/289 |
| 3,590,723 | 7/1971 | Dokos et al. | 99/289 |

Primary Examiner—Richard E. Aegerter
Assistant Examiner—John W. Shepperd
Attorney, Agent, or Firm—Brisebois & Kruger

[57] ABSTRACT

Automatic coffee maker comprises a rotatable chamber defined by upper and lower members which closely approach each other to define a narrow gap at their peripheral edges, one of which edges is flexible. Ground coffee is centrifugally driven toward said gap, which, in one position of the chamber is too narrow to pass the grounds, while permitting liquid to seep therethrough. The chamber may be moved to a second position in which the gap is wide enough to release the grounds.

7 Claims, 6 Drawing Figures

METHOD AND APPARATUS FOR MAKING COFFEE

SUMMARY OF THE INVENTION

This invention relates to an automatic coffee-making machine utilizing a method of centrifugally infusing coffee which has been ground to the required fineness into water which has been previously heated to its boiling point, without utilizing any filter. This machine comprises a mill incorporated therein having a grinding screw which may be mounted to rotate with the drive shaft of a rotating chamber having a sharp circular corner at its periphery. This chamber is defined by two surfaces of revolution which are pressed together in an annular cooperating area which is preferably horizontal and radially thin, which area extends outwardly toward the sharp corner formed by the intersection between said two surfaces of revolution.

When this centrifugal chamber rotates, but contains neither ground coffee nor water, these two surfaces are pressed against each other to form a seal, but because of the use of a slightly elastic deformable material to make the member defining one of said surfaces, they separate slightly from each other when the chamber is rotated with coffee in it, so that the ground coffee, which is compressed and squeezed by the centrifugal force against the sharp connecting corner, cannot be carried out by the water simultaneously subjected to this centrifugal force, but the infusion of coffee thus obtained may, on the contrary, escape through the small space created between the surfaces of revolution. The dimensions of this space may vary from, for example, between 0 and 0.5 mm and the out flow may be collected in an annular gutter provided with at least one duct through which the infusion descends by gravity to fill with coffee either individual cups, or any containers adapted for the transportation of this coffee to the point of consumption.

In a preferred embodiment of the invention the apparatus for rotating said two surfaces is so constructed that said chamber is not supplied with ground coffee and water until after the two surfaces have been pressed together to form a seal. This result is obtained by mounting the upper member of a centrifugal ball bearing device equipped with recesses and internal ramps so as to insure the ascent of said balls during their radial displacement in response to centrifugal force from the time that a lower support for said balls is driven in rotation, the rotation of said centrifugal chamber being stopped periodically by simple braking of the lower ball support. This braking causes radial displacement of the balls toward the center and the corresponding descent of the upper member of the ball bearing device, together with peripheral opening of the chamber, which is biassed downwardly by a spring acting on the upper member of the chamber and having a limited amplitude, while the reduced centrifugal force resulting from the braking permits a descent of greater amplitude by the lower chamber-defining member.

For the convenience of the user, the peripheral opening of said chamber which follows the descent of these two members takes place when the edges of these openings are at the level of a grounds receiving tank beneath said gutter and into which the coffee grounds are then projected by centrifugal force. This descent may be limited to very short intervals of time in the case of continuous operation of the automatic apparatus, thus permitting the simultaneous introduction of the quantities of water and ground coffee which are necessary during the first part of the interval of time separating two successive descents of the chamber.

In a particularly inexpensive embodiment the coffee is stored in granular form at the top of the apparatus and the lower part of the drive shaft for the centrifugal chamber is so machined as to form a grinding screw having a preferably increasing pitch as it approaches the top, which shaft cooperates with a grinding chamber of a generally conical shape and a cross section which decreases toward the bottom.

Automatic devices of a known type than make it possible to simultaneously supply the desired quantity of granular coffee to be admitted to the grinding chamber and the quantity of ground coffee admitted to the centrifugal chamber. These quantities can be periodically adjusted by programmed control means in the case of continuous operation.

The boiling water is preferably obtained by means of an electrical heating resistor of the immersion type, the water surrounding this heater, which is heated by contact therewith, being introduced into the chamber containing said immersion heater at a suitable rate of flow by means of a check valve resisting the return of the hot water or steam through the duct for admitting cold water. This chamber is prefectly sealed and the boiling of the water therein causes a rising of the boiling water to a level sufficient to enable it to spill by gravity into the centrifugal chamber.

In another embodiment of the invention the disc spring constituting the lower member of the centrifugal chamber is equipped at its outer part with a flat rigid disc forming an abutment which limits the amplitude of deformation of the peripheral edge of the disc spring.

The provision of such an abutment makes it possible to insure good retention of the grounds even at a high speed of ejection of the infused coffee.

Moreover, it may be advantageous, while positioning the grinding chamber above the centrifugal chamber, to render the grinding screw independent of the drive shaft of the centrifugal chamber and drive this screw by a separate motor supplied with DC curent, through a rectifier for example, and a device permitting the supply voltage of the motor to be varied.

The provision of such a separate motor, which may operate at a variable speed, makes it possible to vary at will the concentration of the infusion, without modifying the input of hot water, or to compensate for a difference in the quality of the granular coffee used.

It is also possible to brake the lower member of the centrifugal ball-bearing device which is provided to permit the ejection of grounds by supplying a direct current to the windings of an asynchronous motor which drives the centrifugal chamber.

Certain simple modifications may then be made in the mounting of the different members which are superposed on each other and constitute the centrifugal ball-bearing device as well as in the method of attaching the upper member of the centrifugal chamber so as to also obtain in this case two different speeds of the two members of the centrifugal chamber both during the descent of the balls of this centrifugal device and during its upward movement.

It should be noted, moreover, that independently of this question of the method of braking, it is possible without departing from the basic principles of the invention, to provide devices in which the upper member of the centrifugal chamber retains a greater speed than that of the lower member of said chamber both during the ejection of the grounds and during the ascending movement of said chamber which follows said ejection.

The characteristics of the present invention will be better understood from a reading of the following description of two embodiments of electrical coffee makers with grinding devices according to the invention, which embodiments have been given purely by way of illustration and example, with reference to the accompanying drawings on which:

Figure 2:
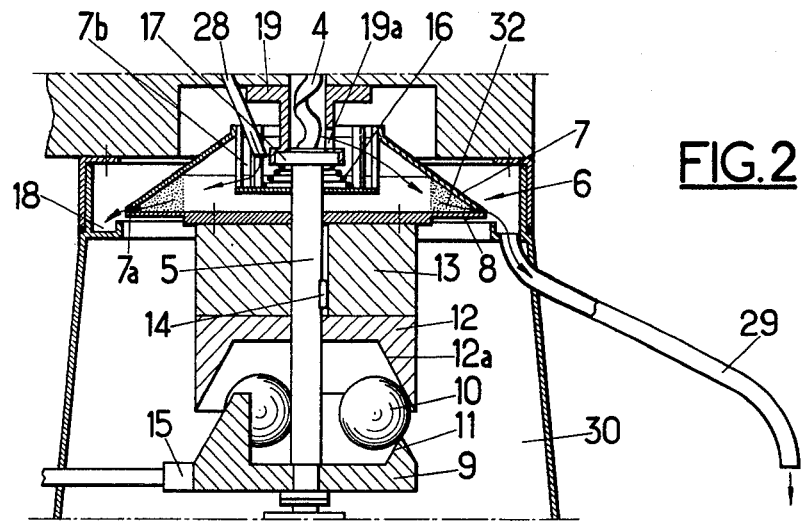
FIG. 2 shows in section part of the device of FIG. 1 during the centrifugation step.
Figure 5:
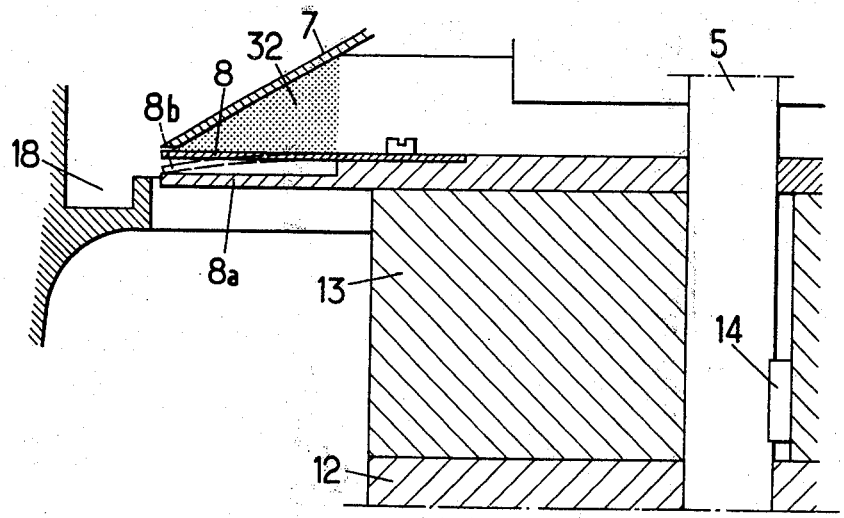
Figure 6:
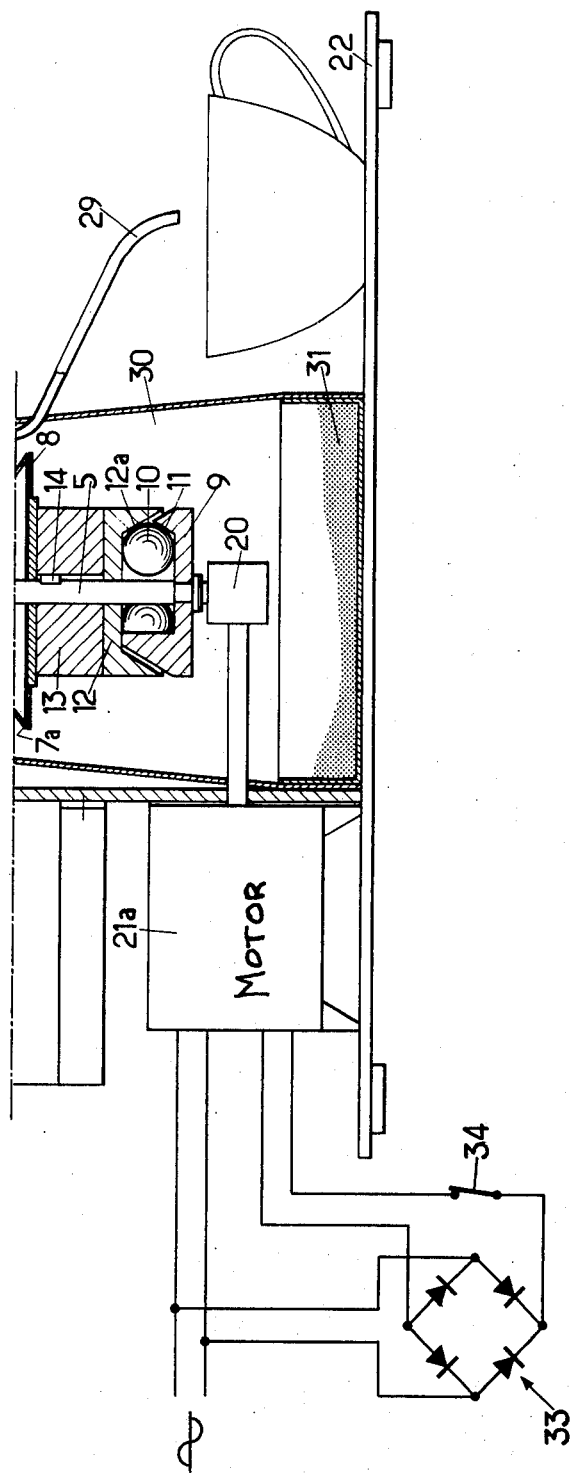

FIG. 5 is a fragmentary diametral sectional view on a larger scale taken in the plane of FIG. 2 through an embodiment comprising a disc spring equipped at its bottom part with a rigid disc adapted to limit its peripheral deformation; and FIG. 6 is a partial diametral sectional view of the centrifugal device, with the motor 21 replaced by an asynchronous motor 21a, which is normally supplied by an A.C. line, but is also supplied with a direct braking current rectified by the diode bridge 33 when the switch 34 is closed.

Figure 1:
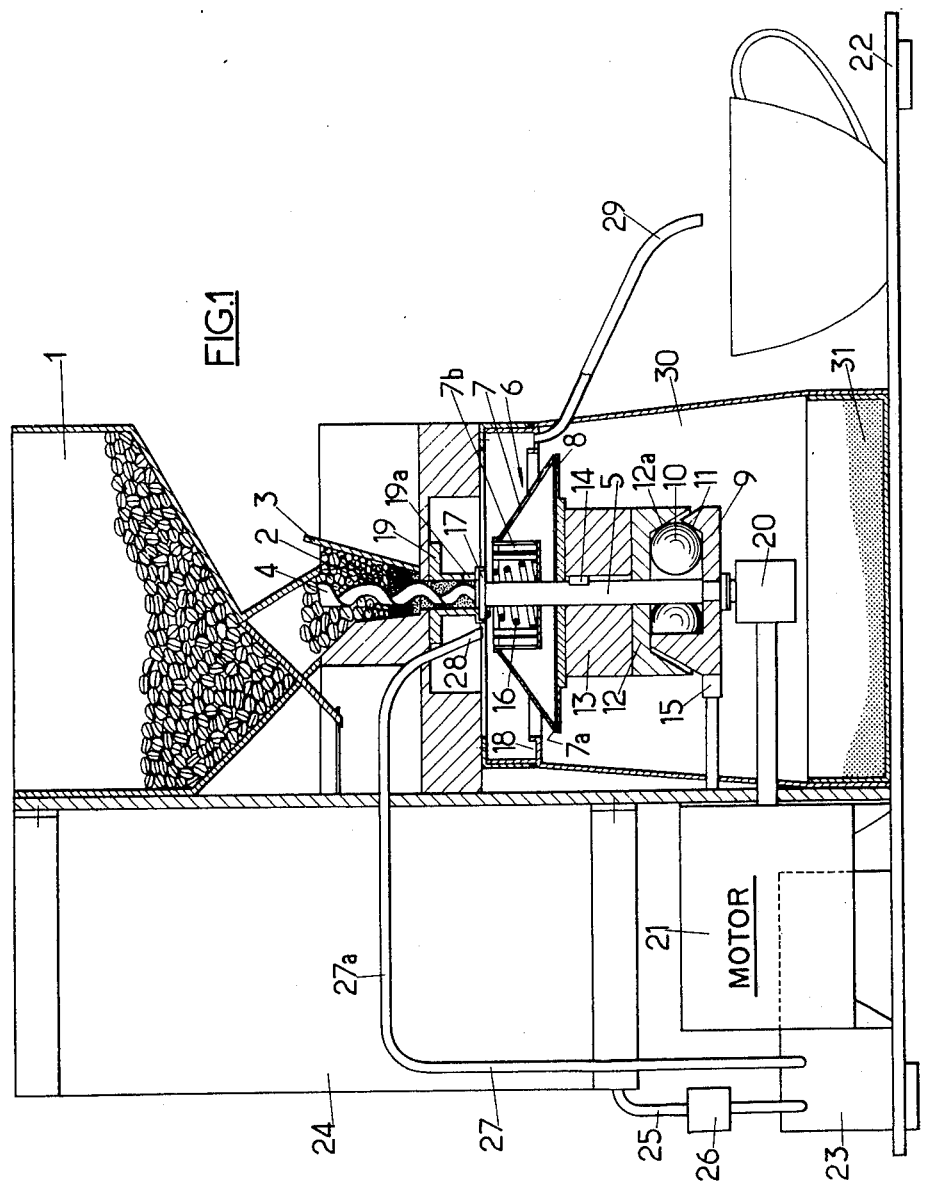
FIG. 1 is a diametral axial sectional view of the centrifugal device at the beginning of the coffee grinding step showing the centrifugal chamber, the annular collecting gutter for hot coffee, a tank for receiving grounds positioned beneath the gutter, and means for periodically emptying this tank into a movable tray.

FIG. 1 shows a chute 1 adapted to be filled with granular coffee which may descend in response to gravitational force into a grinding chamber 2 having a volume which may be adjusted by means of the swinging hatch 3, in which chamber the granular coffee is subjected to the action of a grinding screw 4, forming the upper part of a vertical axis 5 driving at a relatively high speed a centrifugal chamber 6. This chamber is defined by a conical upper wall 7 and a flat lower wall 8 formed of spring material which may be forced against the lower edge of the conical surface 7 during rotation of a lower support 9 mounted to turn freely on the shaft 5.

This lower support 9 is equipped with ball bearings 10 which, in response to centrifugal force, tend to move away from the shaft 5 and rise simultaneously along ramps 11. This double movement causes an intermediate member 12 comprising a hollow cone 12a to rise. The lower wall of this intermediate member cooperates with the balls 10. The member 12 when in its lower position, is frictionally driven through its upper part by an upper member 13 keyed at 14 to the shaft 5 and fixed to a disc 8. The key 14 permits the member 13 to rise along the shaft 5 and permits the disc spring 8 to rise with it, as well as a cone 7, against the lower edge 7a of which this disc is pressed.

It will be noted that as soon as the rotation of the lower support 9 is braked at its periphery by means of a device 15 the balls 10 approach the shaft 5, and the member 12 descends, thus permitting descent of the member 13 and the spring disc 8. As for the cone 7, it also drops downward due to the bias of a spring 16 bearing against the lower surface of a ball bearing 17 in which the shaft 5 rotates, together with the grinding screw 4. The bearing 17 is maintained in place above an annular gutter 18 by a cross member 19.

The shaft 5 is driven through bevel gearing 20 by a motor 21 shown schematically on the drawing. The table 22 which support this motor also supports a heating member 23 of the immersion type which receives water continuously or discontinuously from a reservoir 24, through a duct 25 equipped with a check valve 26 preventing any return through this duct of water heated by contact with the heating element of the heater 23.

When the water thus introduced at appropriate speeds attains the boiling point necessary for the infusion of coffee, the steam which is formed in the fluid-tight heating member 23 causes this water to flow upwardly through the duct 27 to a maximum level 27a from which it redescends by gravity through a duct 28 into the chamber formed by the cone 7 and the spring disc 8.

It will be readily understood that the water passing through the coffee held at the periphery of the chamber constituted by the cone 7 and the disc spring 8 exerts on the disc 8 a pressure sufficient, when the chamber is in its upper position, to permit the ejection of a coffee infusion into the annular gutter 18, from which this coffee descends by gravity through at least one duct 29.

Beneath the gutter 18 is a grounds tank 30 into which the grounds are ejected when the centrifugal chamber is in its lower postion, which is shown on the drawing. This grounds tank communicates through orifices or preferably a vertical duct with the tray 31 permitting the periodic cleaning of the tank. FIG. 1 shows that the granular coffee is first ground by the grinding screw 4 fixed to the vertical shaft 5. The ground coffee leaves through the opening 19a in the cross member 19 and falls into the centrifugal chamber through the openings 7b.

As shown in FIG. 2 the balls 10 are driven simultaneously outwardly by centrifugal force and urge the intermediate member 12 and the upper member 13 upwardly. The ground coffee 32 is pressed into a ring between the cone 7 and the disc spring 8. The hot water delivered by the duct 29 passes through the ground compressed coffee 32. The liquid coffee infusion is projected into the gutter 18.

Figure 3:
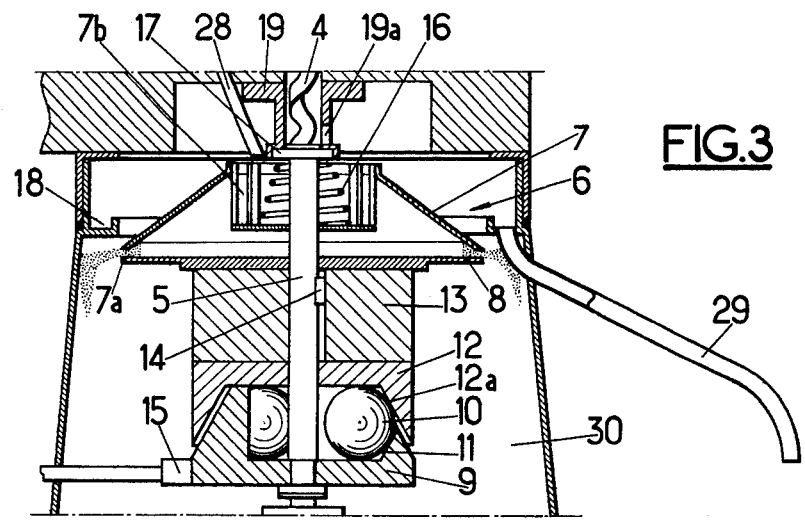
FIG. 3 shows in section a part of the same device during the grounds ejection step.

Then, as shown in FIG. 3, the grounds are ejected from the centrifugal chamber due to the descent of the cone and the disc spring caused by the brake 15.

It will be appreciated that, when the chamber 6 is in its upper (FIG. 2) position, the spring 16 is compressed between the flange 17 on the shaft and the bottom of the cage which holds the spring in the top of the cone 7. Consequently, the cone is biassed strongly downward against the disc 8 forming the bottom of the chamber 7— so strongly that the edges of the cone and disc will separate only far enough to pass fluid coffee, and not far enough to pass grounds.

On the other hand, as the disc descends, the cone follows it down under the combined influences of the spring 16 and gravity. However, at the lower (FIG. 3) position, the spring has substantially expanded so that the downward force which it exerts is much smaller, and the disc and cone will therefore separate further when centrifugal force drives the chamber conents against their edges. This permits the ejection of grounds.

Figure 4:
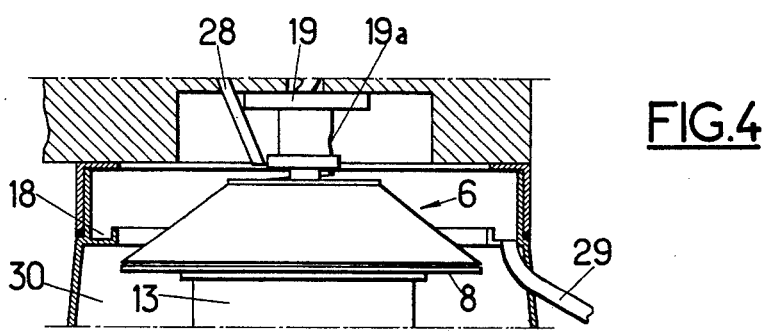
FIG. 4 shows in partial section a part of the same centrifugation device during the ascending movement which follows the grounds ejecting step.

FIG. 4 shows the cone 7 and the disc spring 8 after the end of the operation of ejecting the grounds. These members approach each other, while rotating at different speeds, which frictionally separates the last particles of the grounds remaining in the annular space between the cone 7 and the disc spring 8. An excellent coffee has been produced with the above described device. The granular coffee normally used roasted has been ground in this device to the customary size, the greater part of the coffee particles then having a diameter of about 0.2 mm. The ground coffee is then centrifuged as has been described. It has been observed that the spacing between the cone 7 and the spring disc 8 was maximal at the end of centrifugation but did not exceed 0.2 mm. However, no grounds were found in the coffee projected into the annular gutter 18 and colleced at the end of the duct 29. The water introduced into the rotating chamber through the duct 28 was immediately collected in the gutter 18 in the form of an infusion of coffee. The grounds compressed in the centrifugal chamber are then always practiacally dry, which prevents any entrainment of grounds in the infusion, which entrainment would be possible if the flow of hot water from the duct 29 exceeded the centrifugal capacity of the rotating chamber 6.

Reference numeral 8a on FIG. 5 indicates the rigid disc serving as an abutment for limiting the peripheral deformation of the disc spring 8, and 8b indicates the extreme position shown in broken lines of this disc spring in abutment against the rigid disc 8a.

It is easy to understand that the distance between the edge of the disc 8b and the edge of the cone 7 has been exaggerated for purposes of clarity, but of course this distance remains small so as to to insure excellent retention of the ground compressed coffee at 32.

In like manner, the integral construction of the assembly comprising the ring 8a and the part serving to support disc spring 8 which has been shown in the drawing is not essential since this assembly can easily be made in two distinct parts. As has been stated in the preamble, the motor 20, which is customarily of an asynchronous type, may also be replaced by two separate motors, one of which drives the grinding screw 4 in FIG. 1 and is equipped with a device permitting its speed to be varied.

Moreover, the mechanical braking device 15 shown in FIG. 1, which acts on the lower support 9 of the centrifugal ball bearing device, may be replaced by an electrical device for braking an asynchronous motor driving at least the centrifugal chamber and possibly also the grinding screw, by altering the supply of direct current through the coils of said asynchronous motor.

Finally, the coupling between the shaft of the asynchronous motor for rotating the centrifugal chamber, the different components of the ball bearing centrifugal device, and the two elements defining the centrifugal chamber may be modified so long as, in all cases, a difference in the speed of rotation between the two members defining the centrifugal chamber is insured during the descent and ascent of the balls.

It will of course be appreciated that the two embodiments described may be modified as to detail, and certain components thereof replaced by their mechanical equivalents, without thereby departing from the basic principles of the invention.

What is claimed is:

1. In a device for infusing ground coffee into hot water at a temperature near its boiling point by utilizing centrifugal force, said device comprising
  a shaft mounted to rotate about a substantially vertical axis,
  a centrifugal chamber adapted to receive ground coffee and hot water, said chamber being defined by coaxial upper and lower members, said upper members having a frusto-conical peripheral portion, and said members having registering peripheral edges which define a gap when separated and being slidably mounted on said shaft for vertical movement between locations maintaining said chamber in upper and lower positions,
  means for rotating said shaft and means for rotatably driving at least said lower member from said shaft,
  means for feeding ground coffee and water to said chamber,
  an annular collecting gutter encircling said chamber when said chamber is in said upper position,
  a grounds collecting tank in communication with said chamber through said gap when said chamber is in said lower position, and
  means for moving said chamber between said upper and lower positions,
  the improvement which comprises resilient means urging said upper member downwardly and thus biasing said chamber toward said lower position, said resilient means being compressed when said chamber is in its upper position so as to exert its maximum downward pressure on said upper member, but expanded when said chamber is in its lower position so as to exert a smaller downward pressure on said upper member,
  at least the peripheral portion of one of said chamber-defining members being made of a material which deforms sufficiently in response to the pressure exerted thereon by the contents of said chamber, when said lower member is rotated with said chamber in its upper position and ground coffee and water therein, to open a gap between said peripheral edges wide enough to permit the passage of liquid coffee therethrough, but too narrow to pass grounds,
  while the smaller force exerted by said resilient member on said upper member when said chamber is in said lower position permits a larger gap through which said grounds may escape to be opened between said peripheral edges in response to said pressure when said chamber is rotated in said lower position.

2. Device as claimed in claim 1 in which the upper member is rigid and has a horizontal lower edge, while the lower member is a flat disc having a resilient peripheral portion.

3. Device as claimed in claim 2 in which said disc constitutes the lower member of the centrifugal chamber and is equipped at its peripheral edge with a rigid disc positioned at a small distance below said resilient peripheral portion to limit the maximum amplitude of deformation of said resilient peripheral portion.

4. Device as claimed in claim 1 comprising a cylindrical member through which the lower chamber-defining member is driven from said shaft, said cylindrical member being positioned beneath said lower chamber-defining member, said cylindrical member being keyed to said shaft but mounted to travel vertically along said shaft, and in which said means for vertically moving said chamber is a centrifugal device comprising two superimposed members separated by balls and mounted to rotate independently on said shaft with the uppermost of said superimposed members mounted to rise and fall on said shaft in dependence on the amount of centrifugal force exerted on said balls, means for braking the lowermost of said superimposed members, said lowermost superimposed member being provided with ramp means along which said balls fall to drop said uppermost superimposed member when said lowermost superimposed member is braked.

5. Device as claimed in claim 4 in which said upper chamber-defining member is frictionally driven by said lower chamber-defining member so as to turn at a speed lower than that of the other chamber-defining member as the gap between their edges widens during the descent of the centrifugal chamber so as to frictionally clean the cooperating surfaces of said two chamber-defining members.

6. Device as claimed in claim 4 comprising an asynchronous motor for driving said shaft and means for braking the centrifugal ball bearing device by introducing direct current into the windings of said motor.

7. Device as claimed in claim 1 in which said means for feeding ground coffee to said chamber comprises a grinding chamber at the upper end of said device connected to deliver ground coffee to said centrifugal chamber and a grinding screw connected to said shaft, said screw having a thread which increases in pitch upwardly, said grinding chamber being generally conical and having a transverse section which decreases downwardly.

* * * * *

UNITED STATES PATENT OFFICE
CERTIFICATE OF CORRECTION

PATENT NO. : 3,967,546
DATED : July 6, 1976
INVENTOR(S) : SERGE CAILLIOT

It is certified that error appears in the above-identified patent and that said Letters Patent are hereby corrected as shown below:

[73] Assignee: part interest each to

SOCIETE NORMANDE DE SERVICES,
        Colombes, France...........

ANVAR AGENCE NATIONALE DE
    VALORISATION DE LA RECHERCHE,
        Neuilly-sur-Seine, France..

SOCIETE GENERALE POUR LE
    FINANCEMENT DE L'INNOVATION-
    SOGINNOVE,
        Paris, France..............

Monsieur Bertrand COR,
        Paris, France..............

Monsieur Arnaud GASTINNE,
        Paris, France..............

Signed and Sealed this

Twenty-second Day of March 1977

[SEAL]

Attest:

RUTH C. MASON
*Attesting Officer*

C. MARSHALL DANN
*Commissioner of Patents and Trademarks*